United States Patent [19]

Witchger

[11] Patent Number: 4,586,878
[45] Date of Patent: May 6, 1986

[54] ACCELERATING MEANS AND METHOD FOR TURBOCHARGER

[76] Inventor: Eugene S. Witchger, 210 W. 77th St., Indianapolis, Ind. 46260

[21] Appl. No.: 633,015

[22] Filed: Jul. 20, 1984

[51] Int. Cl.[4] .................. F04B 17/00; F01B 25/02; F03B 1/04
[52] U.S. Cl. ................................ 417/407; 415/166; 415/69
[58] Field of Search .............. 417/405, 406, 407; 60/600, 602, 601, 604; 415/146, 147–148, 159, 166, 64, 69

[56] References Cited

U.S. PATENT DOCUMENTS

| | | | |
|---|---|---|---|
| 856,204 | 6/1907 | Backstrom | 415/166 |
| 1,097,729 | 5/1914 | Rite | 415/143 |
| 3,669,562 | 6/1972 | McNally et al. | 415/159 |
| 3,936,241 | 2/1976 | Einbeck | 417/407 |
| 4,455,121 | 6/1984 | Jen | 415/147 |

FOREIGN PATENT DOCUMENTS

| | | | |
|---|---|---|---|
| 121724 | 7/1943 | Austria | 415/147 |
| 2843202 | 4/1980 | Fed. Rep. of Germany | 417/407 |

OTHER PUBLICATIONS

Satoh, H. et al., "Development of a Variable Geometry Turbocharger for Trucks and Buses," Tokyo International Gas Turbine Congress, Oct. 29, 1983, pp. 599–606.
Simanaitis, Dennis, "Variable Geometry Turbocharging," Road and Track, p. 148.
"Aerodyne Puts an End to the Drag of Turbo Lag," Hot Rod, Jan. 1983, pp. 68–69.

Primary Examiner—Louis J. Casaregola
Assistant Examiner—Timothy S. Thorpe
Attorney, Agent, or Firm—Woodard, Weikart, Emhardt & Naughton

[57] ABSTRACT

Turbocharger acceleration is enhanced by a single element, multi-vane nozzle ring rotatably mounted to the turbine wheel or housing and optimizing exhaust gas flow direction into the turbine wheel at engine idle conditions and other operating conditions, with means to control rotation and speed of the nozzle ring to provide optimum acceleration and cruise conditions by the use of a rotating turbine nozzle ring.

3 Claims, 4 Drawing Figures

ACCELERATING MEANS AND METHOD FOR TURBOCHARGER

BACKGROUND OF THE INVENTION

1. Field of the Invention

This invention relates generally to turbochargers, and more particularly to means to aid in rapid acceleration of the turbocharger from a low speed to obtain a responsive solid feel in a passenger car and to reduce the lag many times associated with turbocharged internal combustion engines.

2. Description of the Prior Art

Efforts have been made to improve acceleration of turbochargers. One example is a variable-geometry turbocharger described in a paper by Satoh et al. for presentation at the 1983 Tokyo International Gas Turbine Congress held in Tokyo, Japan on Oct. 23–29, 1983. The system controls nozzle vane opening and angle in three positions according to engine speed and accelerator pedal signals. A somewhat similar approach is described in an article entitled *Variable-Geometry Turbocharging* in Road & Track Magazine and referring to an Arodyne Dallas, Inc. variable vane turbocharger. Another article on that turbocharger appeared in Hot Rod Magazine, Jan. 28, 1983.

The variable-geometry turbocharging has provided a degree of improved performance, where efforts to reduce rotational inertia seem to have limited further potential. The above-mentioned approaches to geometry typically involve many moving parts in a very harsh and corrosive environment. They may have a great future in large machines where adding thirty to sixty parts is possible and may be worth the complication and expense. When the turbocharger is reduced in size so as to be useful on automobile engines, it becomes impractical to miniaturize all these parts. The present invention is directed to reduction of complexity involved in these variable-geometry prior art techniques.

SUMMARY OF THE INVENTION

Described briefly, according to one embodiment of the present invention, a nozzle ring is mounted on the turbine wheel hub and rotatable thereon. Circularly spaced vanes on the nozzle ring are disposed between the exhaust gas scroll cavity and the turbine wheel and oriented to provide a high degree of impingment force and velocity of the exhaust gas directed at the turbine wheel vanes. The nozzle ring has a rotational inertia delaying its acceleration as exhaust gas flows. Brake means associated with the nozzle ring, can retard or stop the rotation of the nozzle ring. When gas direction for high torque application to the turbine blades and resulting acceleration is no longer needed, the brake can be released so the nozzle ring moves with the turbine wheels thus reducing the effective angle of impingment and the resulting back pressure against the exhaust gases, to optimize efficiency.

DESCRIPTION OF THE PREFERRED EMBODIMENT

Figure 1:
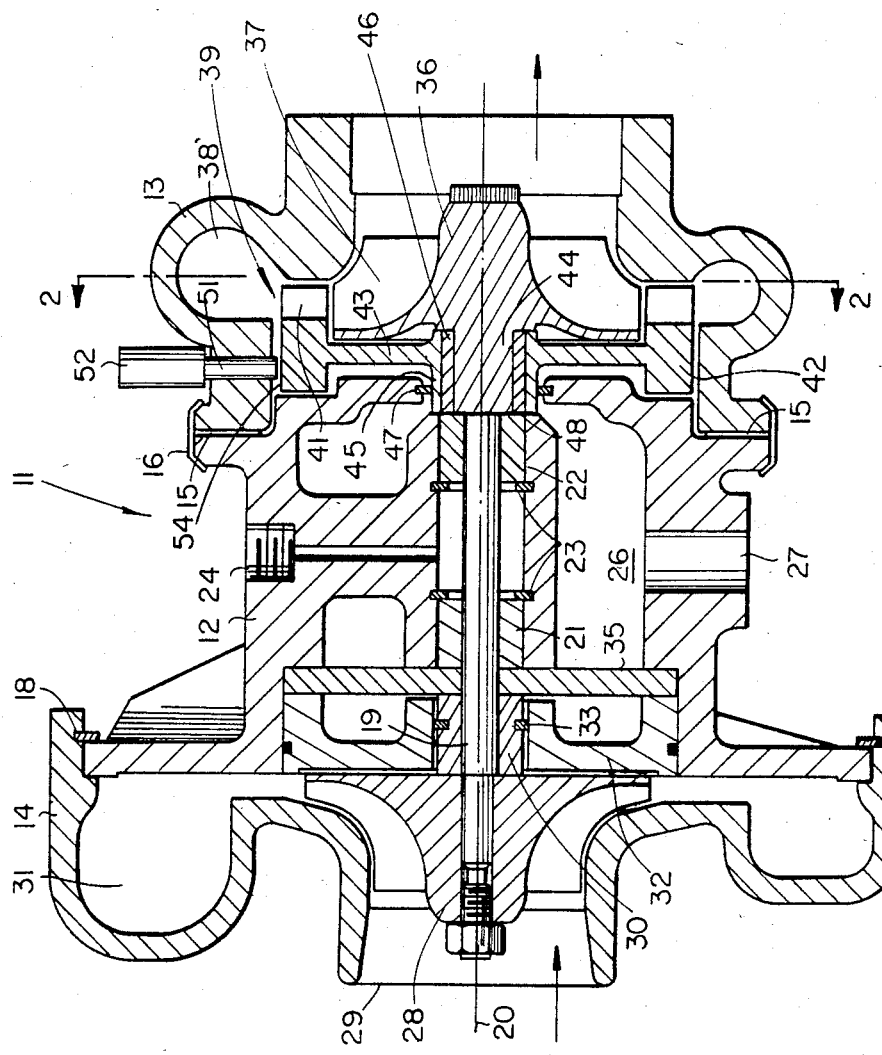
FIG. 1 is a longitudinal section through a turbocharger according to one embodiment of my invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the drawings in detail, the turbocharger 11 includes a bearing housing 12, turbine housing 13, and compressor housinq 14. The bearing housing and turbine housing are secured together by clamp band 16. The compressor housing is secured to the bearing housing by snap ring 18.

Turbine shaft 19 is mounted in bearings 21 and 22 retained in position by locating rings 23. A lubricating oil inlet is provided at 24, drain cavity at 26 and oil outlet drain 27.

The compressor wheel is secured to the turbine shaft by the nut at the end of the shaft. It takes air in at the inlet 29 and discharges it into the scroll 31 from which it is delivered to the engine. A thrust bearing is provided at 30 and seal ring 33 is provided between it and the thrust bearing adapter 32.

Figure 2:
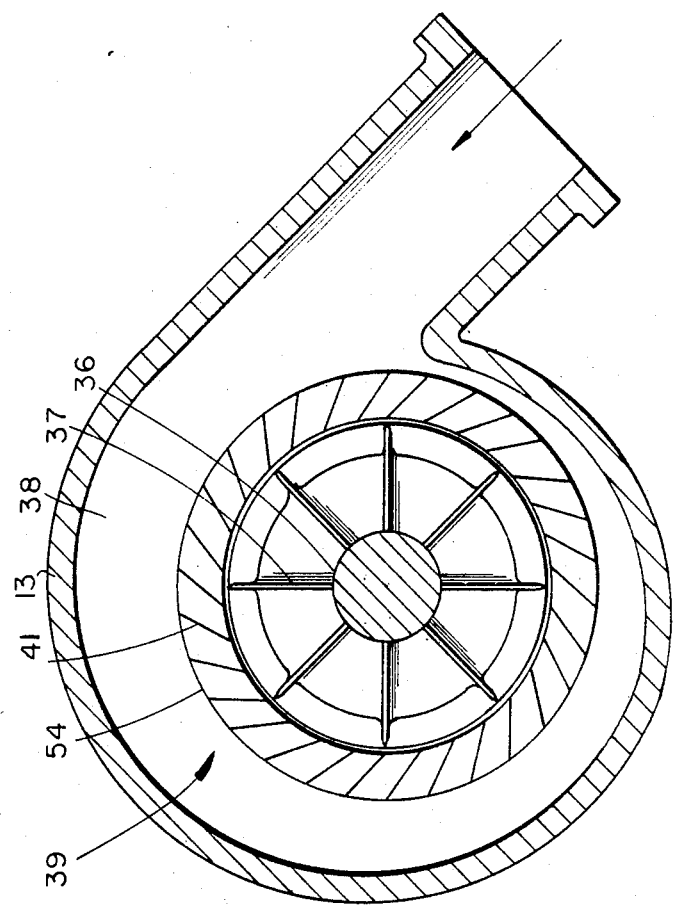
FIG. 2 is a cross section taken at line 2—2 in FIG. 1 and viewed in the direction of the arrows and showing the nozzle ring wheel mounted on the the turbine wheel shaft.

The turbine wheel 36 is at the opposite end of the turbine shaft and has circularly spaced turbine blades 37 on it. The exhaust gas is received into the exhaust scroll 38 shown in FIG. 2 and encounters the nozzle ring 39 according to my invention. This ring has a series of circularly spaced vanes 41 secured to the rim 42 of the disc 43 of the nozzle ring wheel. The disc hub, including the axially-extending flange 45, is rotatably mounted to the bushing 46 mounted to the turbine wheel shaft portion 44. Bushing 46 may be secured to shaft portion 44, or it may float. A seal ring 47 provides a seal between the hub 45 and the aperture in the end wall of the bearing housing 12.

The nozzle ring wheel rim portion 42 is fairly massive, to result in a total rotational inertia of the nozzle ring wheel which is greater than that of the turbine and compressor wheel assembly. A brake plunger 51 is slidably drivable downward by actuator 52 so that the end of the plunger will engage the peripheral surface 54 of the nozzle ring.

The end face of the turbine wheel and the nozzle ring hub are in close proximity to the bushing 22 which takes any small leftward movement against the snap ring 23. Rightward thrust is taken through the compressor wheel 28, spacer 30 and thrust bearing 35.

Figure 3:
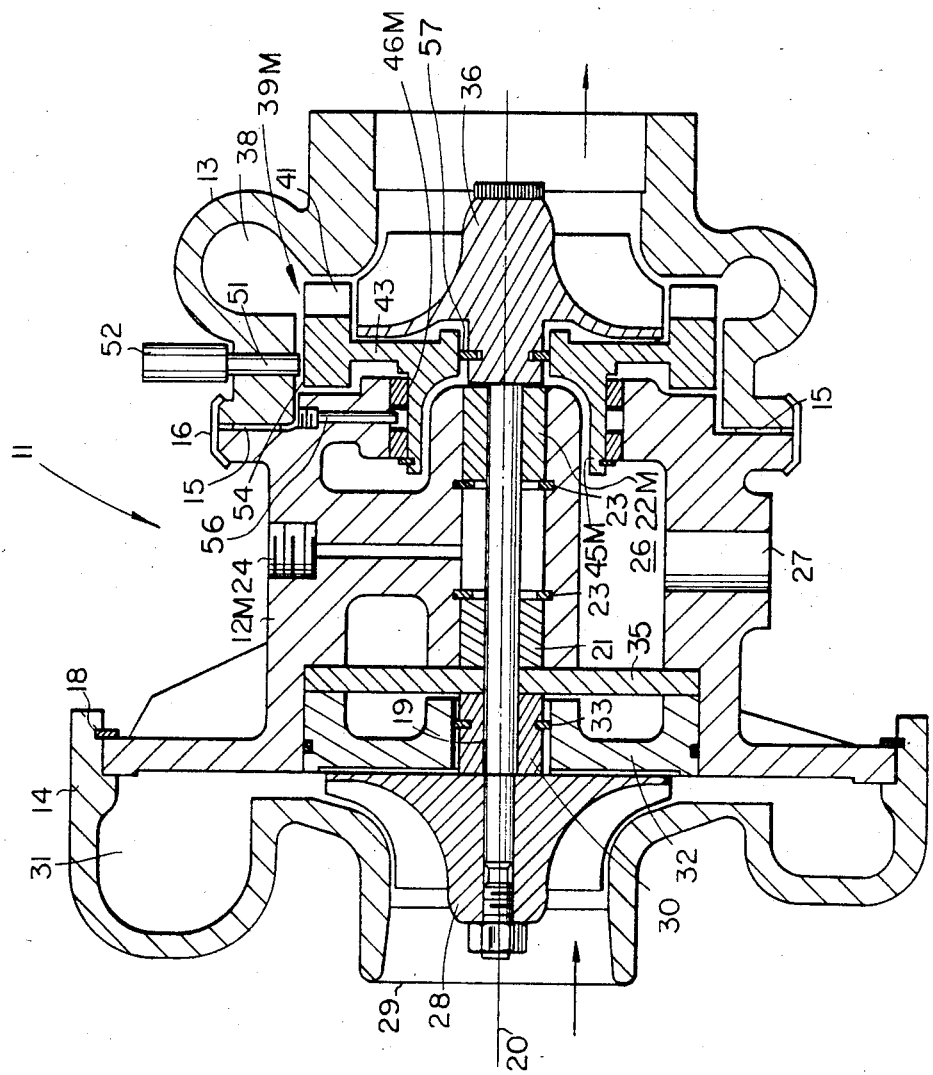
FIG. 3 is a longitudinal section like that of FIG. 1 but showing a second embodiment of my invention wherein the nozzle ring wheel has a separate bearing in the bearing housing substantially on the same center as the turbine wheel.

Referring to the embodiment of FIG. 3, most of the components are the same as in FIG. 1, so have the same reference numerals. Others are modified, so may have a reference numeral with a post-script "M" or a different numeral. In this example, instead of the nozzle ring wheel being mounted on the turbine wheel shaft portion 44, it is mounted in the bearing housing 12M. A bushing 46M is mounted in the right end aperture of the housing, and prevented from axial and rotational movement in the housing by the pin 56 having threads at the upper end threaded into the housing, the lower end of the pin being received in one of the two circularly spaced apertures in the bushing. The nozzle ring wheel hub 45M is rotatably received in the bushing 46M. An oil seal is provided at 57. The construction of this embodiment, by avoiding the mounting of the nozzle ring wheel on the turbine wheel shaft, avoids any possibility that the nozzle ring wheel could mechanically impede acceleration of the turbine wheel.

Figure 4:
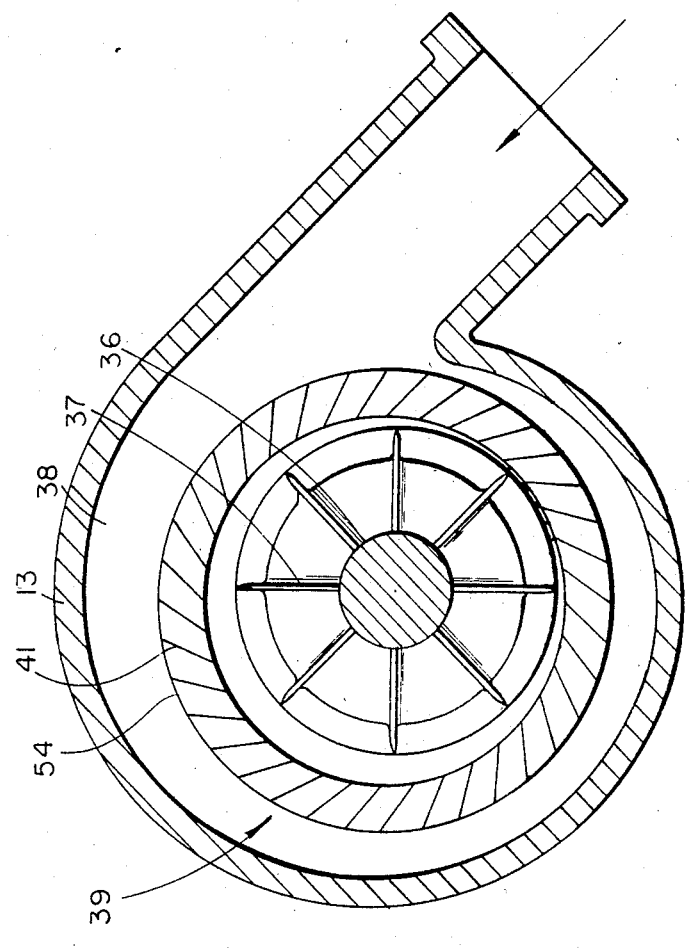
FIG. 4 is a cross section similar to that of FIG. 2 but wherein the nozzle ring wheel is mounted in the housing as in FIG. 3 and has the rotational axis of the nozzle ring wheel slightly off-set from the rotational axis of the turbine wheel if needed to gain an equal boost all around the turbine wheel.

Referring now to FIG. 4, the nozzle ring wheel is mounted as in FIG. 3. Further in contrast to FIGS. 1 and 2, the center 58 of rotation of the nozzle ring wheel in the housing is offset from the axis of rotation of the turbine shaft. By having this offset, it is possible to distribute the exhaust gas to the turbine wheel slightly differently then with the nozzle ring concentric with the turbine wheel. This may be useful to provide a more even distribution of the boost around the circumference of the turbine wheel.

OPERATION

Considering first, the condition of an idling engine and a vehicle at rest. The vehicle operator decides to make a quick start. He pushes the accelerator pedal hard and fully. While the engine will begin to accelerate, the volume and pressure of exhaust gas immediately available to provide the level of immediate boost desired from the turbocharger will not be adequate. Under this condition, the heavy nozzle ring will direct the gas at an advantageous angle against the turbine wheel for a short interval until the nozzle ring wheel catches up in speed. No matter what the constant engine speed may be, the nozzle ring wheel will lag the acceleration of the turbine wheel, thus accelerating the gas when acceleration is demanded, starting from idle or at moderate road speed when acceleration for passing is required. A braking action to accentuate this retarded wheel speed to gain greater effective gas impingment angle can add to the accelerating effect. For that purpose, the brake controller 52 will have the plunger engaged with the nozzle ring, holding it in place. The exhaust gas that is available will be thereby directed on the turbine blades in the most advantageous direction for applying maximum torque to them and thus promptly accelerating the turbine wheel and, thereby, the compressor wheel, which will provide the boost. As exhaust gas production increases, the brake can be released, allowing the nozzle ring to move with the turbine wheel to the extent needed for satisfactory operation under cruising conditions. The timing and amount of brake release, and thereby release of the nozzle ring, can be established as desired, depending upon objectives and priorities. For example, at relatively low cruising speeds, it is still possible to obtain a rapid increase of boost by again applying the brake upon quick and full depression of the accelerator pedal, with subsequent release of the brake in response to release of the accelerator pedal or achievement of a desired level of exhaust gas production or boost.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. The invention claimed is:

1. A turbocharger comprising:
    a housing having an engine exhaust input;
    shaft means having a longitudinal axis and rotatable in said housing on said axis;
    a compressor wheel and turbine wheel secrued to said shaft means, said turbine wheel being in communication with said exhaust whereby the compressor wheel is driven by the turbine wheel on said axis;
    nozzle ring means rotatably mounted in said housing for rotation on an axis, said nozzle ring means having a plurality of vanes disposed in the exhaust gas flow path from the exhaust input of said housing means to said turbine wheel; and
    brake means on said housing and operable, when actuated, to inhibit rotation of said nozzle ring means.

2. The turbocharger of claim 1 wherein: said brake means include a brake engageable with said nozzle ring means to prevent rotation thereof upon actuation of said brake.

3. The turbo charger of claim 2 wherein: said brake means are variably engageable to control nozzle ring means speed independent of turbine wheel speed.

* * * * *

UNITED STATES PATENT AND TRADEMARK OFFICE
CERTIFICATE OF CORRECTION

PATENT NO. : 4,586,878
DATED : May 6, 1986
INVENTOR(S) : Eugene S. Witchger

It is certified that error appears in the above-identified patent and that said Letters Patent are hereby corrected as shown below:

In column 4, line 30, delete the word "secrued" and insert --secured--.

In column 4, line 32, following the word "exhaust" insert --input--.

Signed and Sealed this

Fifteenth Day of July 1986

[SEAL]

Attest:

DONALD J. QUIGG

Attesting Officer

Commissioner of Patents and Trademarks